United States Patent
Tohnai et al.

[11] Patent Number: 5,265,489
[45] Date of Patent: Nov. 30, 1993

[54] ARM-DRIVING DEVICE FOR INDUSTRIAL ROBOT

[75] Inventors: Shuichi Tohnai; Toshiaki Iwanaga, both of Kitakyushu, Japan

[73] Assignee: Kabushiki Kaisha Yaskawa Denki, Fukuoka, Japan

[21] Appl. No.: 867,104

[22] PCT Filed: Oct. 17, 1991

[86] PCT No.: PCT/JP91/01419
§ 371 Date: Jun. 22, 1992
§ 102(e) Date: Jun. 22, 1992

[30] Foreign Application Priority Data

Apr. 20, 1990 [JP] Japan .................... 2-42695

[51] Int. Cl.$^5$ ................... B25J 9/06; B25J 17/00
[52] U.S. Cl. ..................... 74/479 BF; 414/917; 901/21
[58] Field of Search .......... 74/479 BF; 414/917; 901/21

[56] References Cited

U.S. PATENT DOCUMENTS 4,329,111  5/1982  Schmid ................ 414/917 X
5,187,996  2/1993  Torii et al. ............ 414/917 X

FOREIGN PATENT DOCUMENTS 59-110578  6/1984  Japan .
59-146790  8/1984  Japan .
59-182090  10/1984  Japan .
62-84984   4/1987  Japan .

*Primary Examiner*—Allan D. Herrmann
*Attorney, Agent, or Firm*—Jordan and Hamburg

[57] ABSTRACT

In an arm-driving device for an industrial robot wherein one end of a first arm (2) is secured to a first pivot axis (21) pivotally supported by a base (1); one end of a second arm (3) is secured to a second pivot axis (31) pivotally supported by the other end of the first arm (2); and parallel linked pivot axes (44) pivotally provided in a concentric relationship with the first pivot axis (21) are connected to a second pivot axis (31) by parallel links (4) and (5); wherein driven bars (41) and (51) of the two parallel links are secured to both ends of said second pivot axis (31) with said first arm (2) sandwiched therebetween; and two connecting bars (42) and (52) connecting driving bars (43) and (53) secured to said parallel link pivot axes (44) and (45) to driven bars (41) and (51), are offset outside said driving bars (43) and (53) and driven bars (41) and (51), respectively. This prevents interference between the parallel links (4) and (5), expanding the operating range of the arms (2) and (3) significantly.

3 Claims, 5 Drawing Sheets

ARM-DRIVING DEVICE FOR INDUSTRIAL ROBOT

FIELD OF ART

The present invention relates to an arm-driving device for an industrial robot having a plurality of articulations.

BACKGROUND OF THE INVENTION

There is a conventional method of pivoting an arm of an industrial robot by directly driving pivot axes of the arm with driving motors through speed reducers. However, this method is not suitable for those robot having a heavy arm or load because an unbalanced moment at the arm increases the load to the pivot axes. Therefore, in an industrial robot having relatively heavy arms and loads, parallel links are normally constituted by an arm A which corresponds to a driven bar, an arm B, driving bar C. and a connecting bar D as shown in FIG. 5.

However, when the arms are configured using parallel links, there is interference between the arm B and connecting bar D and the operating range is thus narrowed. As a solution to this problem, the description of U.S. Pat. No. 4,329,111 and unexamined Japanese published patent application No. 59-110578 disclose a type wherein the swinging plane of driving bars and driven bars are shifted.

in the above-described conventional configuration, however, when an articulated arm is driven, a driving motor of a second parallel link constituting an arm at the end portion must be secured to the end of a first link supporting a second parallel link to constitute an arm. This increases the weight of the first link and, consequently, the load applied to the driving motor of the first link. Thus, a problem arises in that the rigidity of the first link must be high and the capacity of the driving motor must be large.

It is an object of the present invention to provide an arm-driving device wherein the arms are lightweight so that the operation of the arms can be quick, and wherein the interference of a parallel link driving a second arm is eliminated to enable expansion of the operating range.

DISCLOSURE OF THE INVENTION

The present invention is an arm-driving device for an industrial robot having a first pivot axis pivotally support by a base, a first arm secured to said first pivot axis on one end thereof, a second pivot axis pivotally supported by the other end of said first arm, a second arm secured to said second pivot axis on one end thereof, and parallel links connecting a parallel link pivot axis pivotally provided in a concentric relationship with said first pivot axis, to said second pivot axis, wherein the driven bars of said two parallel links are secured to both ends of said second pivot axis with said first arm sandwiched therebetween; and two connecting bars connecting the driving bars secured to said parallel link pivot axis and said driven bars are offset outside said driving bars and driven bars, respectively.

The driving bars and driven bars of said two parallel links are secured to the parallel link pivot axis and second pivot axis so that a phase difference at a predetermined angle is provided between them.

Two parallel links, each having two connecting bars which are outwardly offset, are connected to both sides of the pivot axis driving the second arm so that said pivot axis can be driven up by a driving motor. This eliminates the possibility of interference from the parallel links.

Further, when the driving bar, connecting bar, driven bar and first arm that constitute a parallel link straightly extend, this single parallel link cannot cause a rotation. However, there is provided another parallel link having another driving bar secured to the pivot axis at a predetermined phase angle with respect to said driving bar. As a result, when one of the parallel links straightly extends, the other parallel link does not straightly extend, and, therefore, it can swing the second arm by the other parallel link.

DESCRIPTION OF THE PREFERRED EMBODIMENT

The present invention will now be described with reference to the illustrated embodiments.

Figure 1:
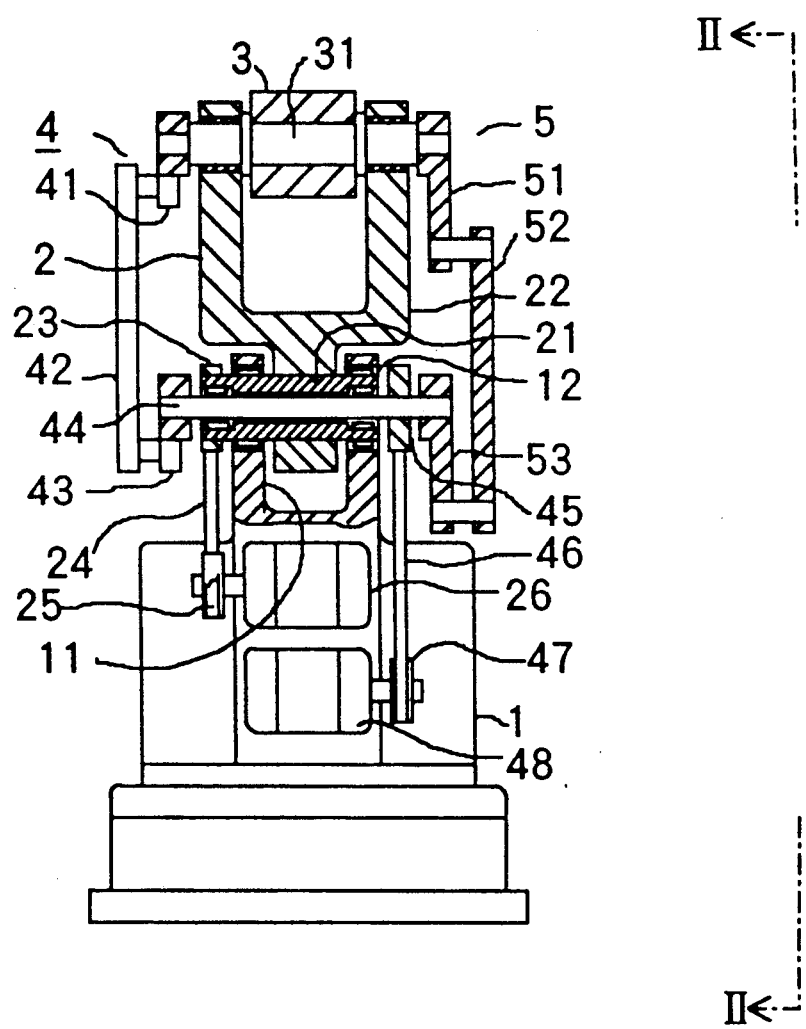
FIG. 1 is a sectional elevation showing an embodiment of the present invention.

FIG. 1 is a sectional elevation showing an embodiment of the present invention. A forked portion 11 is formed on the top of a base 1 so that it sandwiches one end of a first arm 2 to pivotally support the first arm 2 through a bearing 12 provided between a first hollow pivot axis 21 secured to the first arm 2 and the base 1. A forked portion 22 is formed at the other end of the first arm 2 so that it sandwiches one end of a second arm 3 to pivotally support the second arm 3 through a second pivot axis 31 secured to the second arm 3. A pulley 23 is secured to the first pivot axis 21 to rotate the pivot axis 21 by a driving motor 26, secured to the base 1, through transmission devices such as a timing belt 24 and a pulley 25.

One end of a driven bar 41 constituting one parallel link 4 is secured to one end of a second pivot axis 31 secured to the second arm 3 while one end of a connecting bar 42 is pin-connected to the other end of the driven bar 41 so that the connecting bar 42 is offset outside the driven bar 41. One end of a driving bar 43 is pin-connected to the other end of the connecting bar 42 so that the driving bar 43 is offset inside the connecting bar 42. The other end of the driving bar 43 is secured to one end of a parallel link pivot axis 44 which extends through the first hollow pivot axis 21 to be pivotally supported. A pulley 45 is secured to the parallel link 44 to swing the parallel link pivot axis 44 by use of a driving motor 48, secured to the base 1, through transmission devices such as a timing belt 46 and a pulley 47.

Figure 2:
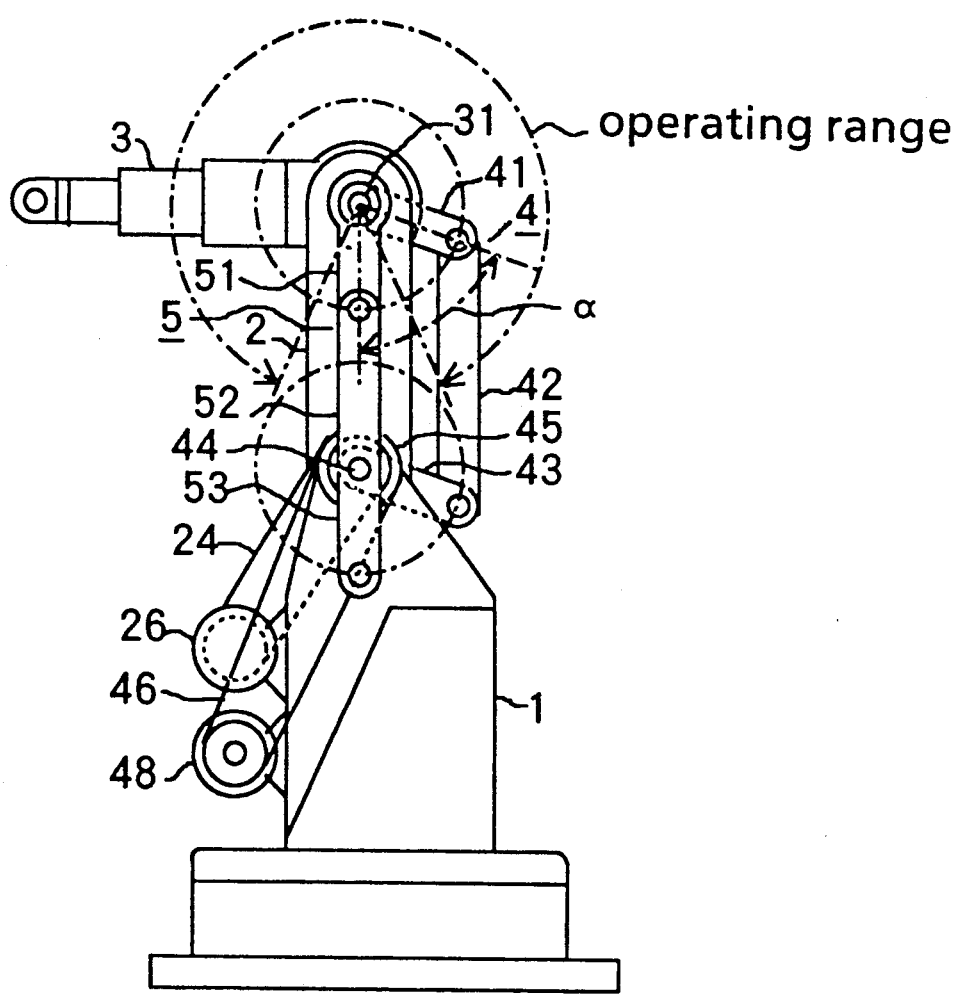
FIG. 2 is a side view taken along the line II—II in FIG. 1.
Figure 3:
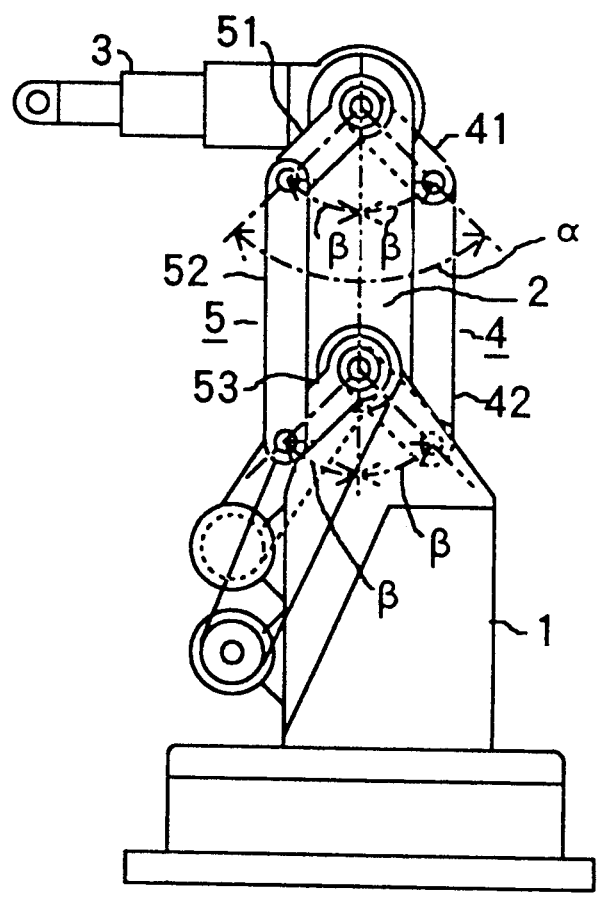
FIG. 3 is a side view showing another embodiment.

One end of a driven bar 41 constituting another parallel link 5 is secured to the other end of the second pivot axis 31 such that the driven bar 51 and said driven bar 41 are angled towards each other at a phase difference of an phase angle α that is close to a right angle (about 70 deg in that example shown in FIG. 2). One end of a connecting bar 52 is pin-connected to the other axis of the driven bar 41 such that the connecting bar 52 is offset outside the driven bar 51. One end of a driving bar 53 is pin-connected to the other end of the connecting bar 52 such that the driving bar 53 is offset inside the connecting bar 52. The other end of the driving bar 53 is secured to the other end of the parallel link pivot axis 44. Therefore, the driving bar 53 is also angled to the driving bar 43 at a phase difference of a phase angle α.

To swing the first arm 2, the first pivot axis 21 is rotated by the driving motor 26 through the pulley 25, timing belt 24, and pulley 23. To swing the second arm 3, the parallel link pivot axis 24 is rotated by the driving motor 48 through the timing belt 26 and pulley 45 to swing the second arm 3 together with the second pivot axis 31 through the driving bar 43, connecting bar 42, and driven bar 41. At the same time, the parallel link pivot axis 44 swings the second arm 3 together with the second pivot axis 31 through the driving bar 53, connecting bar 52, and driven bar 51.

No interference occurs at the parallel links when the second arm 3 is swung because the second pivot axis 31 is driven by the driving motor 48 so that the parallel links r and 5 having the connecting bars 42 and 52, respectively, offset outside thereof, are connected to both sides of the second pivot axis 31. This allows the operating range of the second arm 3 to be expanded to the range of 360 deg minus the range limited by the interference with the first arm 2.

Further, as shown in FIG. 2, a swing can not be caused by only the parallel link 5 when the driving bar 53, connecting bar 52, driven bar 51, and first arm 2 straightly extend. However, since there is provided the parallel link 4 having the driving bar 43 secured to the parallel link pivot axis at a predetermined phase angle to the driving bar 53, the parallel link 4 does not straightly extend at this time and, therefore, the second arm 3 can be swung by the parallel link 4.

Further, in order to share the load applied to the parallel links and the transmission devices for driving their respective parallel links when the second arm 3 has the maximum load, the driving bars 43 and 53, and driven bars 41 and 51 may be secured to the parallel link pivot axes 44 and 54, and second pivot axis 31, respectively, so that they are inclined in opposite directions at the same angle β, e.g., 45 deg to the perpendicular from the second pivot axis to the ground, to set the phase angle at 90 deg.

In addition, the parallel link pivot axis and the driving bars, and the driven bars and the second pivot axis may be secured so that phase angles of the driving bars of the two parallel links can be adjusted depending on the weights and operating ranges of the arms to minimize the load.

Figure 4:
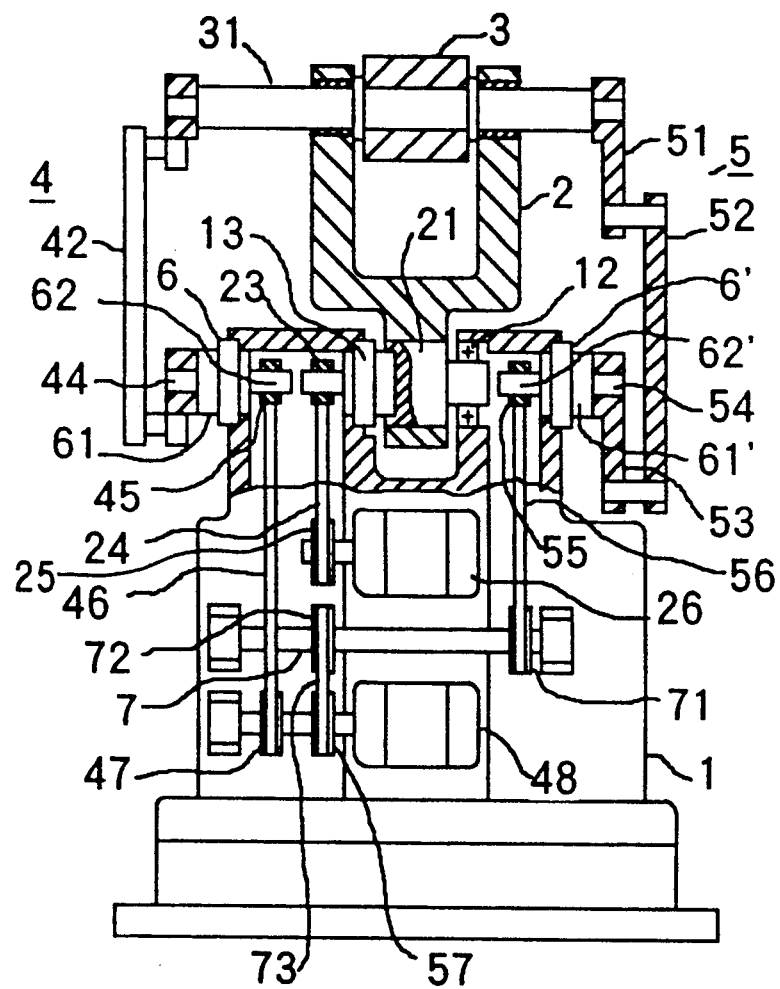
FIG. 4 is a sectional elevation showing another embodiment.
Figure 5:
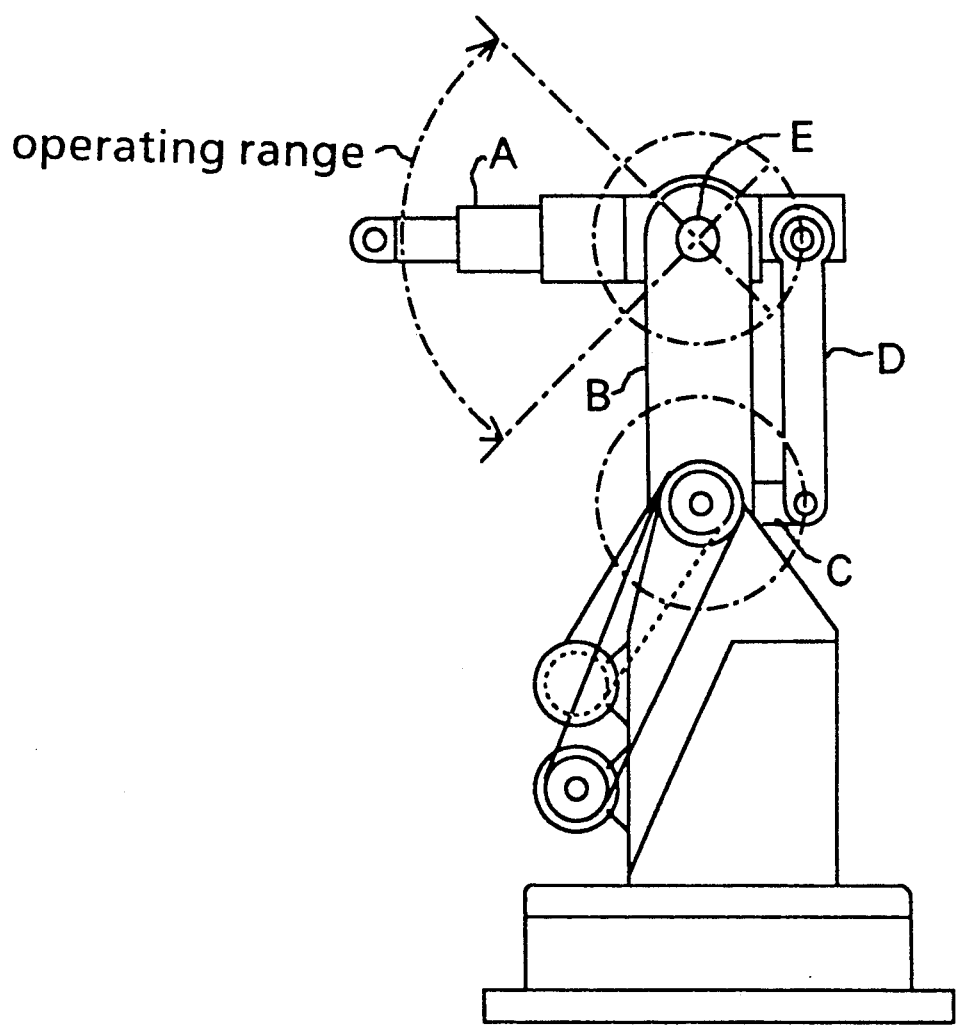
FIG. 5 is a side view showing the prior art.

Further, as shown in FIG. 4, it is possible to employ a configuration wherein the low speed axis of a speed reducer 13 whose securing portion is secured to the base 1, is connected to the first pivot axis 21 while the high speed axis thereof is driven by the driving motor 26 through the pulley 23, timing belt 24, and pulley 25, and the transmission devices of the two parallel links are provided. That is, the parallel link pivot axis 44 driving the parallel links 4 and 5 is divided into parallel link pivot axes 44 and 45, and low speed axes 61 and 61' of speed reducers 6 and 6', whose securing portions are secured to the base 1, are connected to the parallel link pivot axes 44 and 45, respectively. A high speed axis 62 is driven by the driving motor 48 through the pulley 45, timing belt 46, and pulley 47. A high speed axis 62' is driven by the driving motor 48 through a pulley 55, a timing belt 56, and pulleys 71 and 72 secured to a counter shaft 7, a timing belt 73, and a pulley 57 secured to the driving motor 48.

Therefore, the parallel link pivot axes 44 and 45 are rotated synchronically through the speed reducers 6 and 6', and the force for driving the second arm 3 is divided by the two speed reducers. This results in a reduction in the size of the speed reducing mechanism as a whole in spite of the increase in the number of speed reducers.

The parallel link pivot axes driving the parallel links 20 may be driven by separate driving motors, to simplify the configuration of the transmission devices, by controlling the two driving motors for synchronous operation.

As described above, according to the present invention, the connecting bars of two parallel links connected to both sides of a pivot axis pivoting an arm are offset outside the driving bars and driven bars to avoid creating interference between the parallel links. As a result, the operating range of the arm can be expanded.

In addition, a phase difference is provided between the driving bars and driven bars of the two parallel links to allow the arm to be swung by one of the parallel links even when the other parallel link straightly extends. As s result, there is an advantage that an arm-driving device performing stable swing operations can provide.

INDUSTRIAL FEASIBILITY

The present invention can be used in those fields wherein processing and work are carried out using industrial robots.

We claim:

1. An arm-driving device for an industrial robot having a first pivot axis pivotally supported by a base, a first arm secured to said first pivot axis on one end thereof, a second pivot axis pivotally supported by the other end of said first arm, a second arm secured to said second pivot axis on one end thereof, a parallel link pivot axis pivotally provided in an concentric relationship with said first pivot axis, a pair of driven bars secured to both ends of said second pivot axis so that a phase difference at a predetermined angle is provided between them, driving bars pivotally provided at the other ends of said driven bars, and two connecting bars connecting said driven bars and said driving bars, characterized in that the driving of said first pivot axis is performed by a pulley secured to said first pivot axis, a pulley secured to the axis of a first driving motor for swinging the first arm and a timing belt connecting the two pulleys, and the driving of said parallel link pivot axis is performed by a pulley secured to said parallel link pivot axis, a pulley secured to the axis of a second driving motor for pivoting the parallel link pivot axis and a timing belt connecting the two pulleys.

2. An arm-driving device for an industrial robot according to claim 1 wherein said first pivot axis is hollow, and said parallel link pivot axis extends through the hollow portion.

3. An arm-driving device for an industrial robot having a first pivot axis pivotally supported by a base, a first arm secured to said first pivot axis on one end thereof, a second pivot axis pivotally supported by the other end of said first arm, a second arm secured to said second pivot axis on one end thereof, a parallel link pivot axis pivotally provided in a concentric relationship with said first pivot axis, a pair of driven bars secured to both ends of said second pivot axis so that a phase difference at a predetermined angle is provided between them, driving bars pivotally provided at the other ends of said driven bars, and two connecting bars connecting said driven bars and said driving bars, characterized in that the driving of said first pivot axis is performed by the first pivot axis connected to the low speed axis of a first speed reducer secured to the base, a pulley provided at the high speed side of said first speed reducer and a pulley secured to the axis of a first driving motor for swinging the first arm and a timing belt connecting the two pulleys; the parallel link pivot axis pivotally provided in a concentric relationship with said first pivot axis is divided into left and right axes; the driving of one of said left and right axes is performed by one of said left and right axes being connected to the low speed axis of a second speed reducer secured to the base, a pulley provided at the high speed axis of said second speed reducer, a pulley secured to the output axis of a second driving motor for swinging one of said left and right axes, and a timing belt connecting the two pulleys; and the driving of the other of said left and right axes is performed by a pulley secured to the low speed axis of a third speed reducer secured to the base, a pulley provided at the high speed side of said third speed reducer, a pulley provided at one end of a counter shaft provided between said parallel link pivot axis and said second driving motor for swinging the other of said left and right axes, a timing belt connecting the two pulleys, a pulley provided at the other end of said counter shaft, a pulley provided in association with said pulley secured to the end of the output axis of the second driving motor for swinging the other of said left and right axes, and a timing belt connecting the two pulleys.

* * * * *